United States Patent
Kim et al.

(10) Patent No.: US 10,210,823 B2
(45) Date of Patent: Feb. 19, 2019

(54) LIGHT DEFLECTOR AND DISPLAY APPARATUS

(71) Applicant: SAMSUNG ELECTRONICS CO., LTD., Suwon-si (KR)

(72) Inventors: Young Kim, Yongin-si (KR); Yunhee Kim, Seoul (KR); Hoon Song, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 143 days.

(21) Appl. No.: 15/171,587

(22) Filed: Jun. 2, 2016

(65) Prior Publication Data

US 2017/0200423 A1   Jul. 13, 2017

(30) Foreign Application Priority Data

Jan. 13, 2016   (KR) .................. 10-2016-0004420

(51) Int. Cl.
  *G09G 3/34*   (2006.01)
  *G02F 1/29*   (2006.01)
  *G02B 27/22*  (2018.01)
  *G09G 3/36*   (2006.01)

(52) U.S. Cl.
  CPC ....... *G09G 3/3433* (2013.01); *G02B 27/2214* (2013.01); *G02F 1/29* (2013.01); *G09G 3/36* (2013.01)

(58) Field of Classification Search
  None
  See application file for complete search history.

(56) References Cited

U.S. PATENT DOCUMENTS

| | | | |
|---|---|---|---|
| 8,891,052 B2 | 11/2014 | Sugiyama et al. | |
| 2008/0030527 A1* | 2/2008 | Namie | G06T 3/4023 345/698 |
| 2009/0201236 A1* | 8/2009 | Arai | G02B 26/0833 345/84 |
| 2009/0323194 A1* | 12/2009 | Lin | G02B 6/0036 359/639 |

(Continued)

FOREIGN PATENT DOCUMENTS

| | | |
|---|---|---|
| JP | 2004-29393 A | 1/2001 |
| JP | 2001-272924 A | 10/2001 |

(Continued)

OTHER PUBLICATIONS

Communication dated Jun. 30, 2017 issued by the Korean Intellectual Property Office in counterpart Korean Patent Application No. 10-2016-0004420.

(Continued)

*Primary Examiner* — Christopher J Kohlman
(74) *Attorney, Agent, or Firm* — Sughrue Mion, PLLC

(57) ABSTRACT

A light deflector includes a first light deflecting member disposed on a transparent substrate and has a refractive index that varies depending on a magnitude of an electric field applied thereto. The light deflector may adjust the refractive index by applying electric fields differently according to regions of the first light deflecting member or time divisions. The light deflector may have a smaller size than a light deflector including an optical device, and may easily adjust the refractive index.

19 Claims, 8 Drawing Sheets

(56) References Cited

U.S. PATENT DOCUMENTS

| | | | |
|---|---|---|---|
| 2013/0113767 A1* | 5/2013 | Hayashi | G09G 3/003 345/207 |
| 2014/0176671 A1* | 6/2014 | Choi | G03H 1/08 348/40 |
| 2015/0142536 A1 | 5/2015 | Marlow et al. | |
| 2015/0260996 A1 | 9/2015 | Chen et al. | |

FOREIGN PATENT DOCUMENTS

| | | |
|---|---|---|
| JP | 2003-66405 A | 3/2003 |
| JP | 2006-189573 A | 7/2006 |
| KR | 10-2014-0091790 A | 7/2014 |
| KR | 10-2014-0094156 A | 7/2014 |
| WO | 2012066776 A1 | 5/2012 |

OTHER PUBLICATIONS

Communication dated Jan. 9, 2018, issued by the Korean Intellectual Property Office in counterpart Korean Patent Application No. 10-2016-0004420.

* cited by examiner

LIGHT DEFLECTOR AND DISPLAY APPARATUS

CROSS-REFERENCE TO RELATED APPLICATION

This application claims priority from Korean Patent Application No. 10-2016-0004420, filed on Jan. 13, 2016 in the Korean Intellectual Property Office, the disclosure of which is incorporated herein in by reference its entirety.

BACKGROUND

1. Field

Apparatuses and methods consistent with exemplary embodiments relate to light deflectors and display apparatuses.

2. Description of the Related Art

As information-oriented society has developed, demands for fields of displaying have increased in various ways. Light deflectors for changing a proceeding direction of light have been mainly manufactured by using optical devices such as lenses or mirrors, but in this case, light deflectors are large in volume and there is a limitation in a speed of converting angles. Accordingly, research onto a light reflector that uses a light deflection panel that changes a proceeding direction of light by using electric signals has been conducted. Such a light deflector may be used in a display apparatus capable of displaying two-dimensional (2D) images, three-dimensional (3D) images, and holographic images.

SUMMARY

One or more exemplary embodiments provide light deflectors and display apparatuses.

According to an aspect of an embodiment, there is provided a light deflector including: a light source configured to emit light of a plurality of wavelength; a first light deflecting member that is configured to deflect the light incident from the light source, and includes a light path conversion surface configured to adjust the deflection direction of the incident light; and a controller configured to control the first light deflecting member so that the light of the plurality of wavelengths which is incident onto the light path conversion surface is deflected in a same direction.

The first light deflecting member may include: a light deflecting layer on which the light path conversion surface is disposed; a first electrode layer disposed on a surface of the light deflecting layer; and a second electrode layer disposed on another surface of the light deflecting layer, wherein the light deflecting layer is disposed between the first electrode layer and the second electrode layer.

The first electrode layer may include a plurality of first sub-electrodes that are spaced apart from one another.

The second electrode layer may be a common electrode configured to apply a voltage between the second electrode layer and each of the plurality of first sub-electrodes.

The controller may apply a voltage to each of the plurality of first sub-electrodes so as to adjust the light path conversion surface.

A refractive index distribution of the light deflecting layer may be obtained according to a voltage distribution applied between each of the plurality of first sub-electrodes and the second electrode layer, and an interface between two different refractive indexes in the light deflecting layer may become the light path conversion surface.

The first electrode layer and the second electrode layer may include a transparent conductive material.

The light deflecting layer may include liquid crystal.

The controller may control the light source and the light deflecting member so that the light having the plurality of wavelengths passes through the light deflecting member in a time multiplexing manner.

The controller may divide one frame into a plurality of sub-frames, may control the light source so that light beams of different wavelengths are incident to the light deflecting member at a same angle within the plurality of sub-frames, and may control the light deflecting member so that angles of the light beams of different wavelengths incident onto the light path conversion surface are different from each other.

The time durations of the plurality of sub-frames may be equal to each other.

The light deflector may further include a second light deflecting member that comprises a light path conversion surface that has a variable inclination so that a deflection direction of incident light is adjusted.

The plurality of wavelengths may include a first wavelength and a second wavelength which is different from the first wavelength. The light source may emit the light of the first wavelength to the first light deflecting member, and may emit the light of second wavelength to the second light deflecting member.

The controller may control the first light deflecting member and the second light deflecting member so that the light of the first wavelength is incident to the light path conversion surface of the first light deflecting member at a first incident angle and the light of the second wavelength is incident to the light path conversion surface of the second light deflecting members at a second incident angle, the second incident angle being different from the first incident angle.

The light deflector may further include at least one light path conversion member configured to convert a light path so that the light of the first wavelength and the second wavelength respectively emitted from the first light deflecting member and second light deflecting member forms a same light path.

The light path conversion member may include a dichroic mirror.

The second light deflecting member may be located on a light path through which the light reflected from the first light deflecting member proceeds, and may include a light path conversion surface that has a variable inclination to adjust the deflection direction of the light passing through the first light deflecting member.

An inclination of the light path conversion surface of the first light deflecting member varies along a first axis and an inclination of the light path conversion surface of the second light deflecting member varies along a second axis which is perpendicular to the first axis.

According to an aspect of another exemplary embodiment, a display apparatus may include: the light deflector; and a display panel configured to modulate light deflected from the first light deflecting member according to image information.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
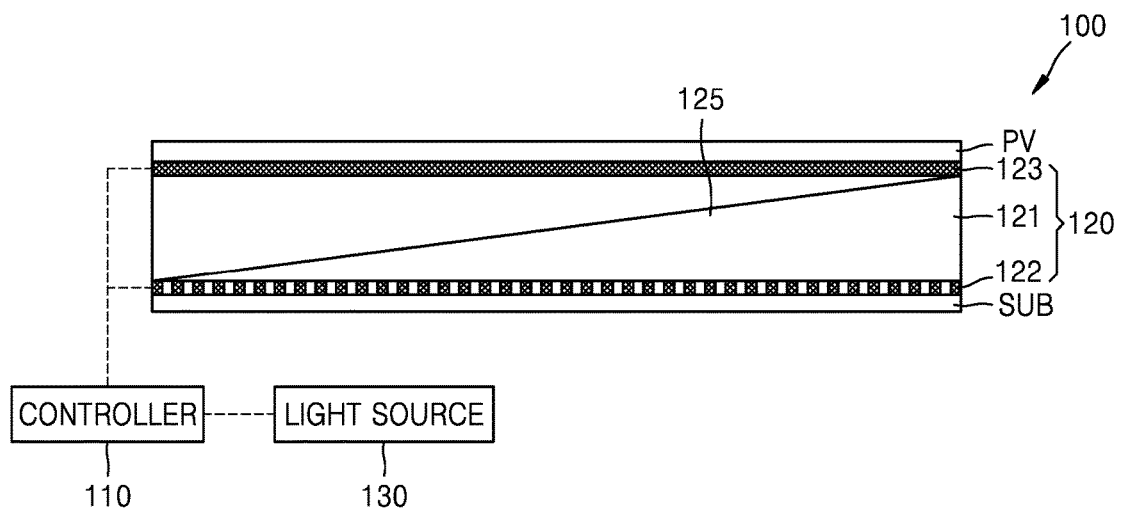
FIG. 1 is a schematic cross-sectional view of a light deflector according to an embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Hereinafter, when an element or layer is referred to as being "on" another element or layer, the element or layer can directly on the other layer, or intervening layers may also be present. As used herein, the term "and/or" includes any and all combinations of one or more of the associated listed items. Expressions such as "at least one of," when preceding a list of elements, modify the entire list of elements and do not modify the individual elements of the list.

FIG. 1 is a schematic cross-sectional view of a light deflector 100 according to an exemplary embodiment. For example, the light deflector 100 may be implemented by a spatial light modulator. Referring to FIG. 1, the light deflector 100 includes a first light deflecting unit 120 including a light deflecting layer 121, a first electrode layer 122, and a second electrode layer 123, and a controller 110 that controls the first light deflecting unit 120. The first light deflecting unit 120 deflects light incident from a light source 130 and outputs deflected light. The first light deflecting unit 120 may include a light path conversion surface 125 that may be variable so as to adjust a deflection direction of incident light. The light path conversion surface 125 may be configured so that light beams of a plurality of wavelength components included in the incident light may be deflected by the same angle. The controller 110 may adjust the light path conversion surface 125 by adjusting a voltage distribution.

The light deflector 100 according to the exemplary embodiment may prevent a scattering phenomenon of incident light by deflecting the incident light having a plurality of wavelength components and incident at a predetermined angle in a constant direction. The light maintains its proceeding direction within a region having the same refractive index, and then, is refracted by a predetermined angle when the light encounters an interface having a different refractive index. Since the refractive angle is dependent upon a wavelength of the light, mixed light including a plurality of wavelengths may have the refractive index that varies depending on each of the wavelengths at the interfaces between different refractive indexes. For example, when white light, in which red light, green light, and blue light are mixed, passes through an interface between the refractive indexes, a refractive angle $\theta_R$ of the red light, a refractive angle $\theta_G$ of the green light, and a refractive angle $\theta_B$ of the blue light are different from one another. As such, each of light beams emitted from the light reflector 100 may not be focused. Therefore, the controller 110 may control the light path conversion surface 125 so that the refractive angles of the light of the plurality of wavelengths may be equal to one another, and thereby preventing scattering of light.

In order to apply a light deflector in various display apparatuses such as a three-dimensional (3D) display apparatus, a holographic display apparatus, etc., scattering of the light has to be reduced. If a focusing device is additionally provided due to the scattering effect, the display apparatus becomes greater in volume, and manufacturing costs may increase. Accordingly, the light deflector 100 according to the exemplary embodiment may prevent the scattering of light by using a time multiplexing method or a space multiplexing method.

The first light deflecting unit 120 may include the light deflecting layer 121, and the first electrode layer 122 and the second electrode layer 123 that are separate from each other as the light deflecting layer 121 is interposed therebetween.

The light deflecting layer 121 may include the light path conversion surface 125 that deflects the incident light according to a magnitude of an applied voltage. For example, the light deflecting layer 121 may include liquid crystal. The light deflecting layer 121 may function as an isotropic plate, a deflecting function of which is turned off, when a voltage is not applied thereto. The light deflecting layer 121 in the above status may transmit the incident light without deflecting the light. When a voltage is applied to the light deflecting layer 121, the light deflecting layer 121 may have an index gradient according to arrangement of a director of the liquid crystal therein. The director of the liquid crystal may be arranged in an electric field direction with a positive dielectric anisotropy, and may be arranged in a direction perpendicular to the electric field direction with a negative dielectric anisotropy. According to the above principle, the orientation of the liquid crystal director may be adjusted according to a voltage distribution applied to the light deflecting layer 121. The light path conversion surface 125 may be formed according to the orientation of the liquid crystal director.

The light source 130 may emit the light having a plurality of wavelength components to the first light deflecting unit 120 with a constant incident angle. The light source 130 may be controlled by the controller 110.

Figure 2:
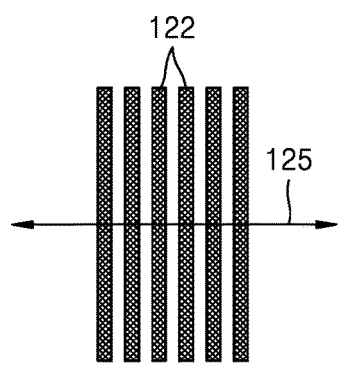
FIG. 2 is a schematic plan view of a sub-electrode pattern.

The first electrode layer 122 may apply a voltage to the light deflecting layer 121 according to control of the controller 110. The first electrode layer 122 may include a plurality of first sub-electrodes that are spaced apart from each other. Referring to FIG. 2, the first electrode layer 122 may include a plurality of first sub-electrodes that are spaced apart from each other in a direction. The direction in which the first sub-electrodes are arranged may be equal to an axial direction by which the light path conversion surface of the light deflecting layer 121 varies. The first electrode layer 122 may include a transparent conductive material such as indium-tin-oxide (ITO), indium-zinc-oxide (IZO), and indium-tin-zinc-oxide (ITZO).

The second electrode layer 123 may apply a voltage between the first electrode layer 122 and the second electrode layer 123. The second electrode layer 123 may include a transparent conductive material such as ITO, IZO, and ITZO. The second electrode layer 123 may function as a common electrode to which a constant voltage is applied. For example, the second electrode layer 123 may be formed integrally on an entire surface of a transparent substrate SUB. However, one or more exemplary embodiments are not limited thereto, and the second electrode layer 123 may include a plurality of second sub-electrodes respectively corresponding to the first sub-electrodes of the first electrode layer 122. Here, the plurality of second sub-electrodes may function as common electrode to which a constant voltage is applied, or a voltage distribution is applied to the second sub-electrodes and the first sub-electrodes may function as the common electrode. As a summary, a driving voltage is applied to one of the first electrode layer 122 and the second electrode layer 123 for adjusting the light path conversion surface 125 of the light deflecting layer 121, and then the other one may function as the common electrode. In the exemplary embodiment, the second electrode layer 123 is integrally formed with the entire surface of the substrate.

The controller 110 may include devices for adjusting the light path conversion surface 125 by applying voltages to the first electrode layer 122 and the second electrode layer 123. For example, the controller 110 may include an electrical addressing structure for controlling each of the first sub-electrodes of the first electrode layer 122. The electrical addressing structure may include a transistor structure. Also, the electrical addressing structure may be transparent. The controller 110 may apply a voltage of a predetermined magnitude to the second electrode layer 123 so that the second electrode layer 123 functions as a common electrode.

The transparent substrate SUB may be a substrate on which the first light deflecting unit 120 may be formed, and thus, has to be transparent so that the incident light may pass.

A passivation layer PV is disposed on the light deflecting unit 120 in order to protect the light deflector against external shock or stimulation. The passivation layer PV may be transparent.

FIG. 2 is a schematic cross-sectional view of a sub-electrode pattern. The first electrode layer 122 may include the plurality of first sub-electrodes as described above. Referring to FIG. 2, the first sub-electrodes may be regularly spaced apart from each other in a certain direction, e.g., along a first direction. The first direction may be equal to an axial direction of the light path conversion surface 125.

FIGS. 3A, 3B, 4, and 5 are diagrams illustrating operations of the light deflector 100 in a time multiplexing manner. According to the light deflector in the time multiplexing manner, the controller 110 may control the light source 130 (see FIG. 1) and the light deflecting unit 120 so that the light having a plurality of wavelength components may pass through the light deflecting unit 120.

Figure 3A:
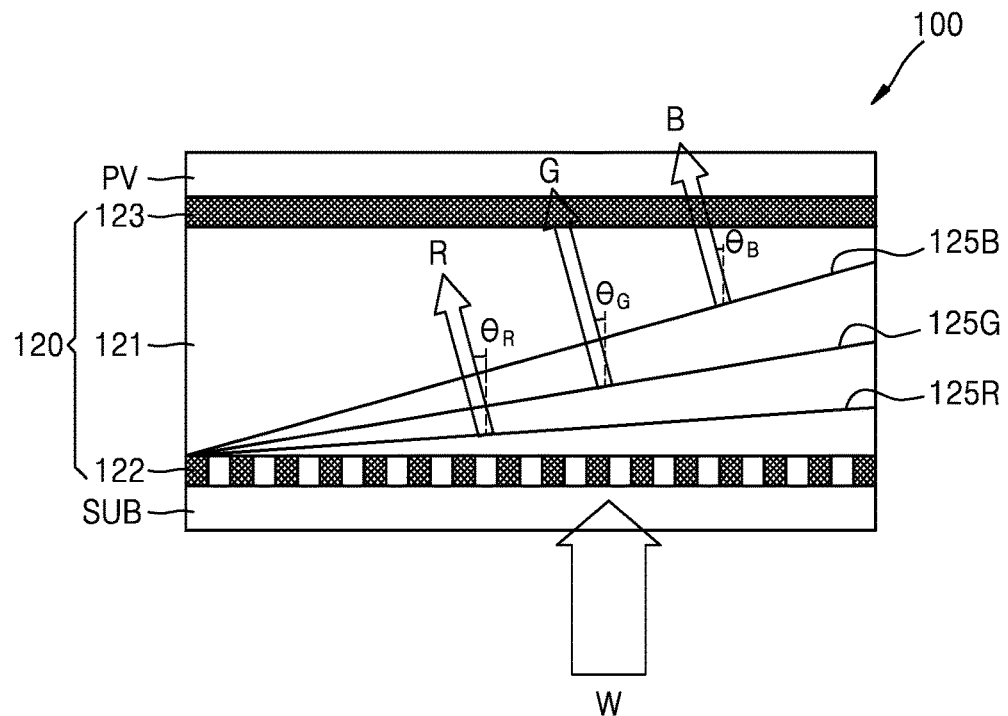
FIGS. 3A and 3B are schematic diagrams of a light reflector to which light is applied.

FIG. 3A is a schematic cross-sectional view illustrating operations of the light deflector 100 of FIG. 1 in the time multiplexing manner. Referring to FIG. 3A, light path conversion surfaces 125R, 125G, and 125B may deflect the incident light corresponding to each of time sections at the same angle. The light path conversion surfaces 125R, 125G, and 125B may denote deflection surfaces that are formed according to changes in refractive index gradient of the light deflecting layer 121. The light path conversion surfaces 125R, 125G, and 125B are formed as planes so that refractive index surfaces have functions of a prism, and accordingly, the incident light may be refracted by a predetermined angle according to the wavelengths. However, the light path conversion surfaces 125R, 125G, and 125B may not be necessarily flat surfaces, but curved surfaces.

Figure 4:
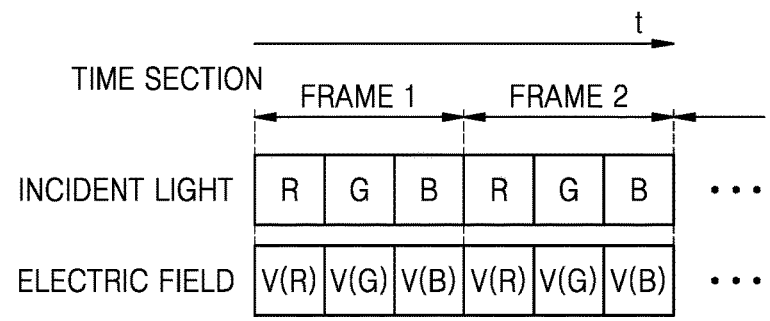
FIGS. 4 and 5 are diagrams illustrating operations of the light deflector of FIG. 1 in a time multiplexing manner.

Referring to FIG. 4, light of different wavelengths is incident to the light deflector 100 of the exemplary embodiment according to time lapse, and then inclinations of the light path conversion surfaces 125R, 125G, and 125B may vary depending on the incident light. For example, red light R, green light G, and blue light B may be incident to the light deflector 100 repeatedly by a predetermined time period therebetween. Referring to FIG. 4, a time section during which the red light R, the green light G, and the blue light B are sequentially input may be defined as a frame.

The frame may be divided into a plurality of sub-frames. For example, a time section during which each of the red light R, the green light G, and the blue light B is incident may correspond to each of the sub-frames. A time duration of each sub-frame may be equal to those of the other sub-frames. For example, time durations of the sub-frames corresponding to the red light R, the green line G, and the blue light B, that is, incident light, may equal to one another. The red light R, the green line G, and the blue light B may be sequentially emitted to the light deflecting unit 120, according to the time sections corresponding to the sub-frames.

The controller 120 may apply an electric field V(R) to the light deflecting unit 120 to form the light path conversion surface 125R that is inclined by an angle $\theta_R$. The controller 120 may apply the electric field V(R) during the time duration in which the red light R is emitted so that the red light R is deflected by the light path conversion surface 125R having the angle $\theta_R$. Next, the controller 110 may apply an electric field V(G) to the light deflecting unit 120 to form the light path conversion surface 125G that is inclined by an angle $\theta_G$. The controller 120 may apply the electric field V(G) during the time duration in which the green light G is emitted so that the green light G is deflected by the light path conversion surface 125G having the angle $\theta_G$. Then, the controller 110 may apply an electric field V(B) to the light deflecting unit 120 to form the light path conversion surface 125B that is inclined by an angle $\theta_B$. The controller 120 may apply the electric field V(B) during the time duration in which the blue light B is emitted so that the blue light B is deflected by the light path conversion surface 125B having the angle $\theta_B$.

The controller 110 (see FIG. 1) may control the light source 130 so that light beams of different wavelengths may be incident to the light deflecting unit 120 at the same incident angle. For example, the controller 110 (see FIG. 1) may control the light source 130 so that the red light R, the green light G, and the blue light B may be incident to the light deflecting unit 120 at the same incident angle as each other. Since the light path conversion surfaces 125R, 125G, and 125B have different inclinations from each other, an incident angle of the red light R incident onto the light path conversion surface 125R, an incident angle of the green light G incident onto the light path conversion surface 125G, and an incident angle of the blue light B incident onto the light path conversion surface 125B may be different from each other. The incident angle of the red light R may correspond to an angle between the red light R and a perpendicular vector from the light path conversion surface 125R. The incident angle of the red light G may correspond to an angle between the red light G and a perpendicular vector from the light path conversion surface 125G. The incident angle of the blue light B may correspond to an angle between the blue light B and a perpendicular vector from the light path conversion surface 125B.

The deflection angle of each wavelength may satisfy the relation as expressed by Equation 1 below.

$$\theta_R = \theta_G = \theta_B \quad (1)$$

Figure 3B:
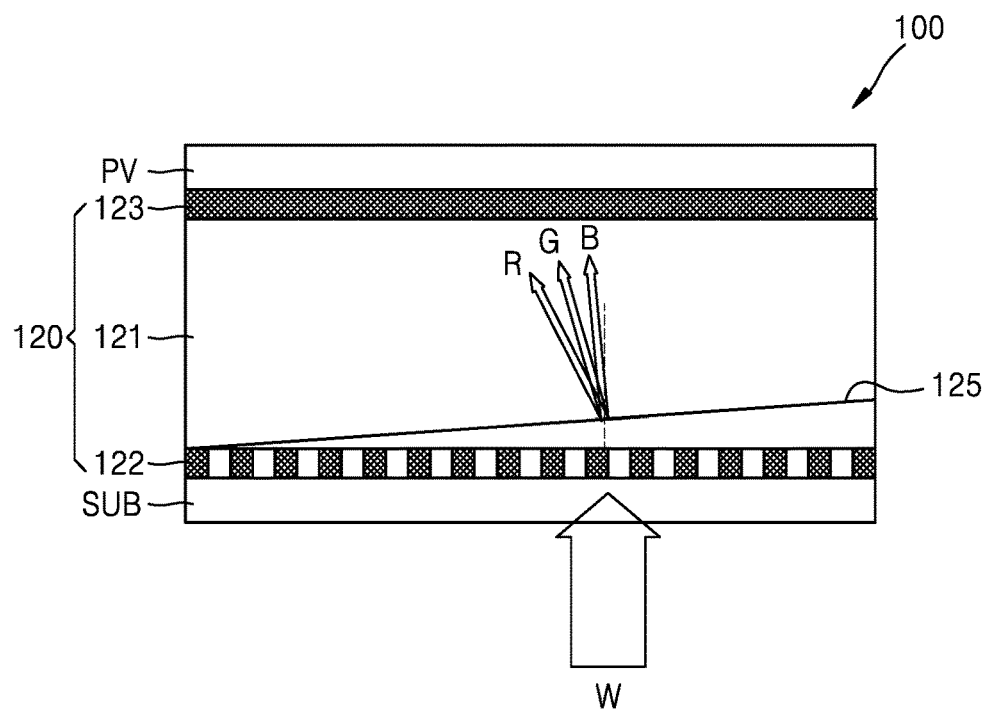

In addition, referring to FIG. 3B, white light W including the red light R, the green light G, and the blue light B may be continuously emitted according to the time sections corresponding to the sub-frames, but in this case, the scattering prevention effect may degrade.

Figure 5:
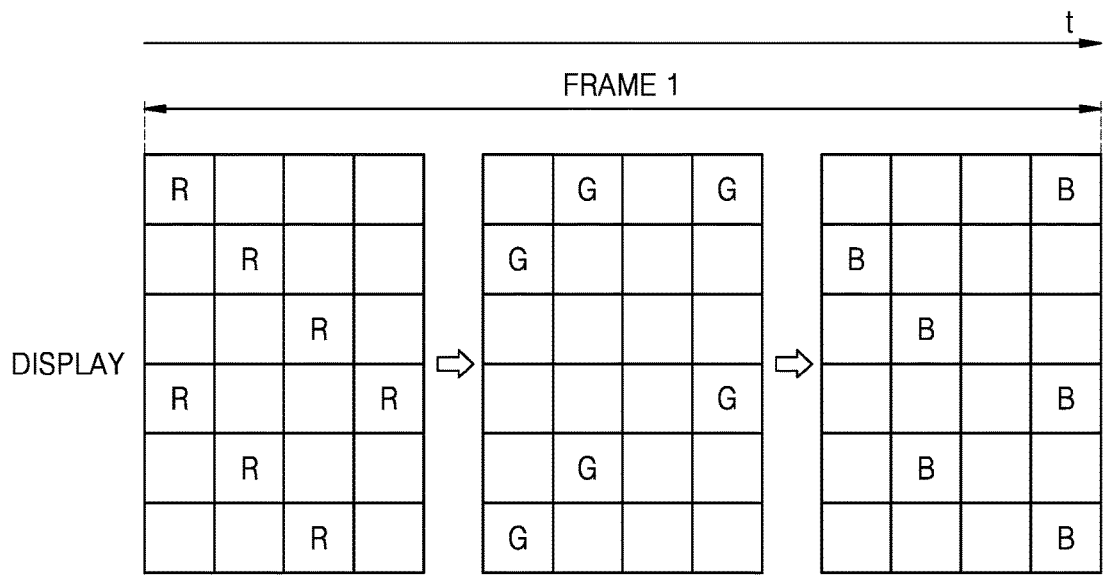

When the light deflector 100 of the time multiplexing type is used in the display apparatus, a screen displayed on the display apparatus may be shown as FIG. 5. In order to represent one screen, pixels of the red light R, the green light G, and the blue light B are expressed respectively according to the time lapse within one frame, that is, the time section, and the pixels are combined to express an image. Since a human body may recognize a set of discrete pictures having a frequency of 60 Hz or greater as an image, the time section of one frame may be, e.g., 1/60 second. In addition, the time section for each of the red light R, the green light G, and the blue light B may be 1/3 of one frame, that is, 1/180 sec. The sub-frames may have the same time durations.

Figure 6:
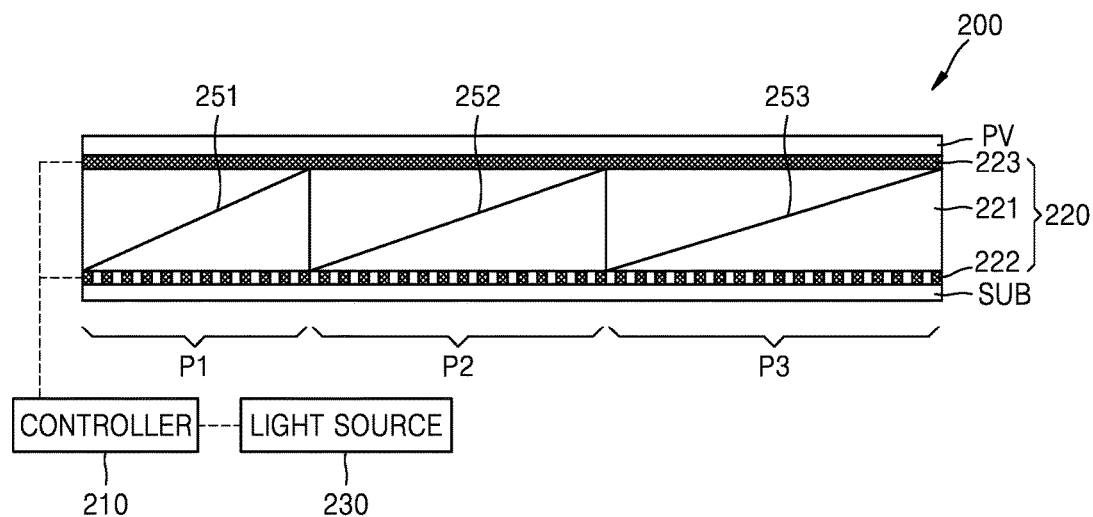
FIG. 6 is a schematic cross-sectional view of a light deflector according to an embodiment.

FIGS. 6 to 9 are diagrams illustrating operations of a light deflector in a space multiplexing manner. FIG. 6 is a schematic cross-sectional view of a light deflector 200 according to another exemplary embodiment. The light deflector 200 of the exemplary embodiment may further include a second light deflecting unit P2 having a light path conversion surface that is variable to adjust the deflection direction of incident light. A light source 230 may provide a first light deflecting unit P1 and the second light deflecting unit P2 with light beams of different wavelengths. In the exemplary embodiment, the first deflecting unit P1, the second deflecting unit P2, and a third deflecting unit P3 may denote separate regions where the different light path conversion surfaces are formed in the light deflecting unit including a light deflecting layer 221, a first electrode 222, and a second electrode 223. Unlike the above-described time multiplexing manner, the light deflector 200 of the space multiplexing type partitions an area so as to separate light path conversion surfaces on partitioned areas by controlling the first electrode 222 and the second electrode 223. A controller 210 may control the first light deflecting unit P1 and the second light deflecting unit P2 so that the light of different wavelengths may be incident to light path conversion surfaces 251 and 252 of the first and second light deflecting units P1 and P2 at different angles from each other.

Figure 7:
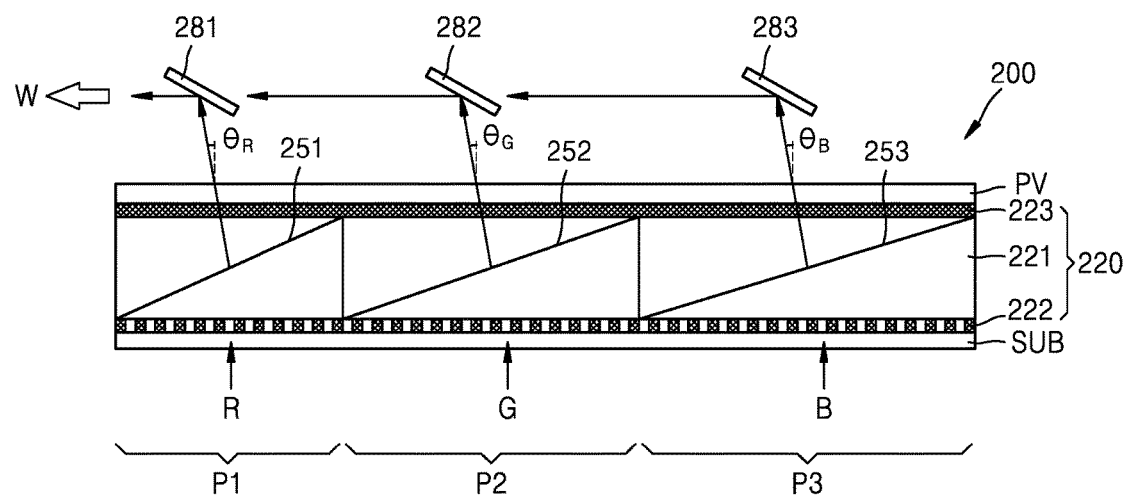
FIG. 7 is a schematic cross-sectional view of a light deflector according to an embodiment.

Referring to FIGS. 6 and 7, a light source 230 may emit the red light R, the green light G, and the blue light B so that the red, green, and blue light R, G, and B may be incident respectively to the first light deflecting unit P1, the second light deflecting unit P2, and the third light deflecting unit P3 at the same incident angles as each other. The controller 210 may apply an electric field V(R) to the first light deflecting unit P1 to form the light path conversion surface 251 inclined at an angle $\theta_R$. The controller 120 may apply the electric field V(R) during the time duration in which the red light R is emitted so that the red light R is deflected by the light path conversion surface 251 having the angle $\theta_R$. The controller 210 may apply an electric field V(G) to the second light deflecting unit P2 to form the light path conversion surface 252 that is inclined at an angle $\theta_G$. The controller 120 may apply the electric field V(G) during the time duration in which the green light G is emitted so that the green light G is deflected by the light path conversion surface 252 having the angle $\theta_G$. The controller 210 may apply an electric field V(B) to the third light deflecting unit P3 to the light path conversion surface 253 that is inclined at an angle $\theta_B$. The controller 120 may apply the electric field V(B) during the time duration in which the green light G is emitted so that the blue light B is deflected by the light path conversion surface 253 having the angle $\theta_B$. As described above, the deflection angles of the light, that is, $\theta_R$, $\theta_G$, and $\theta_B$, are controlled to be equal to each other so as to prevent scattering of the light.

FIG. 7 is a schematic cross-sectional view of the light deflector 200 according to another exemplary embodiment. Referring to FIG. 7, the light deflector 200 may further include at least one light path conversion member 280 for converting the light path so that light beams of different wavelengths emitted from the light deflecting unit may propagate along the same light paths as each other. The light path conversion member 280 may include a dichroic mirror. The dichroic mirror is a kind of optical member that selectively transmits or reflects light according to a wavelength thereof. Since a third light path conversion member 283 selectively reflects the blue light B, the third light path conversion member 283 may include a mirror or metal. Since a second light path conversion member 282 has to transmit the blue light B and to change the light path of the green light G, the second light path conversion member 282 may be a dichroic mirror that reflects the green light G. A first light path conversion member 281 has to transmit the red light R and to change the light paths of the green light G and the blue light B, and thus, the first light path conversion member 281 may be a dichroic mirror that reflects the red light R.

Figure 8:
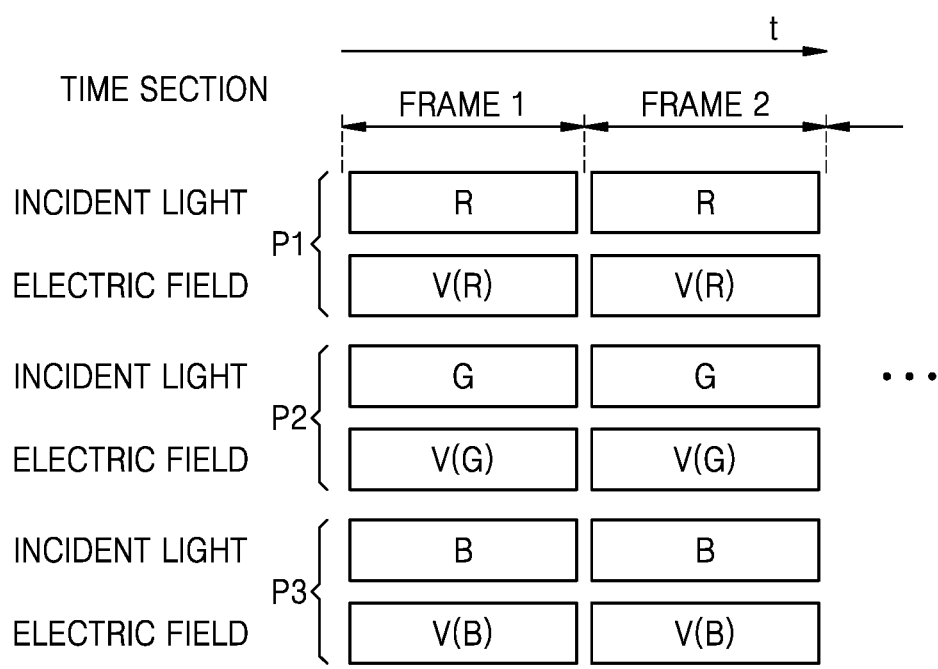
FIGS. 8 and 9 are diagrams showing operations of the light deflector of FIG. 7 in a time multiplexing manner.
Figure 9:
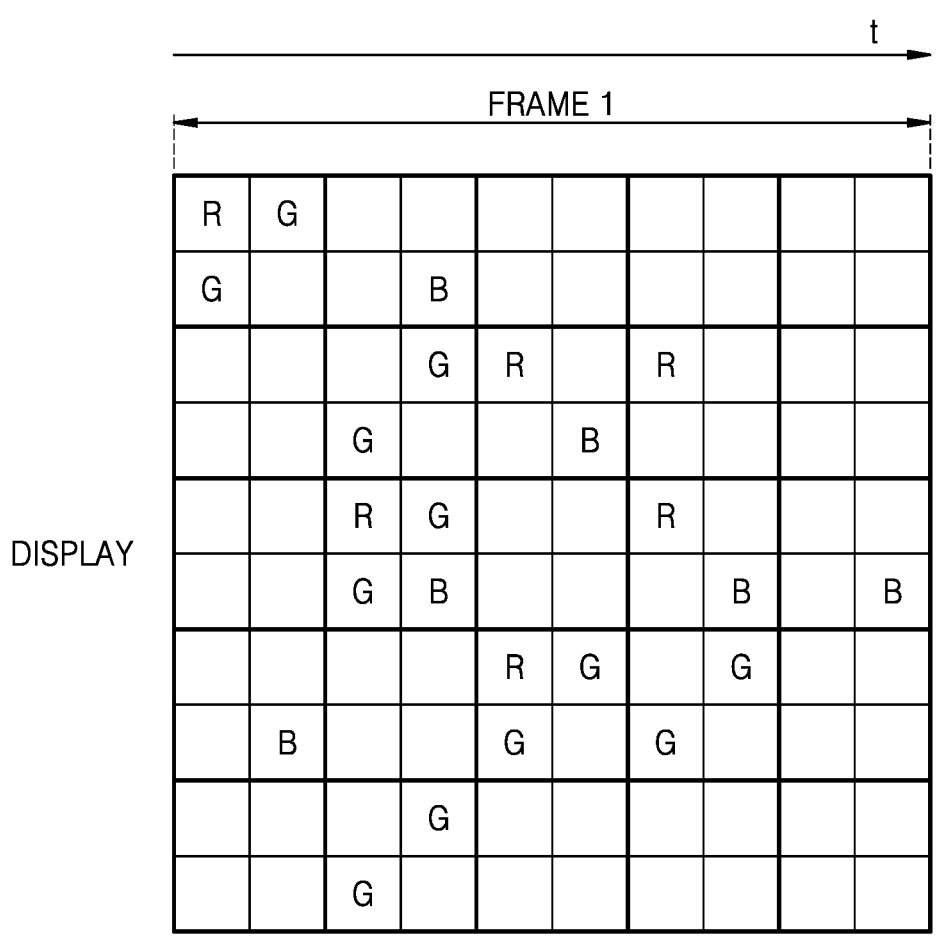

Referring to FIG. 8, in the space multiplexing type light deflector 200, the light source 230 may provide the first light deflecting unit P1, the second light deflecting unit P2, and the third light deflecting unit P3, with light beams of different wavelengths within the same time frame. A display apparatus including the light deflector operating in the space multiplexing manner may display a screen as shown in FIG. 9. In order to express one screen, pixels of the red light R, the green light G, and the blue light B may be represented at the same time within the same time frame. Unlike the time multiplexing manner, since pixels respectively for the red light R, the green light G, and the blue light B are separately necessary, an entire area of the display apparatus may increase. For example, the pixels may be arranged as a Bayer pattern.

Figure 10:
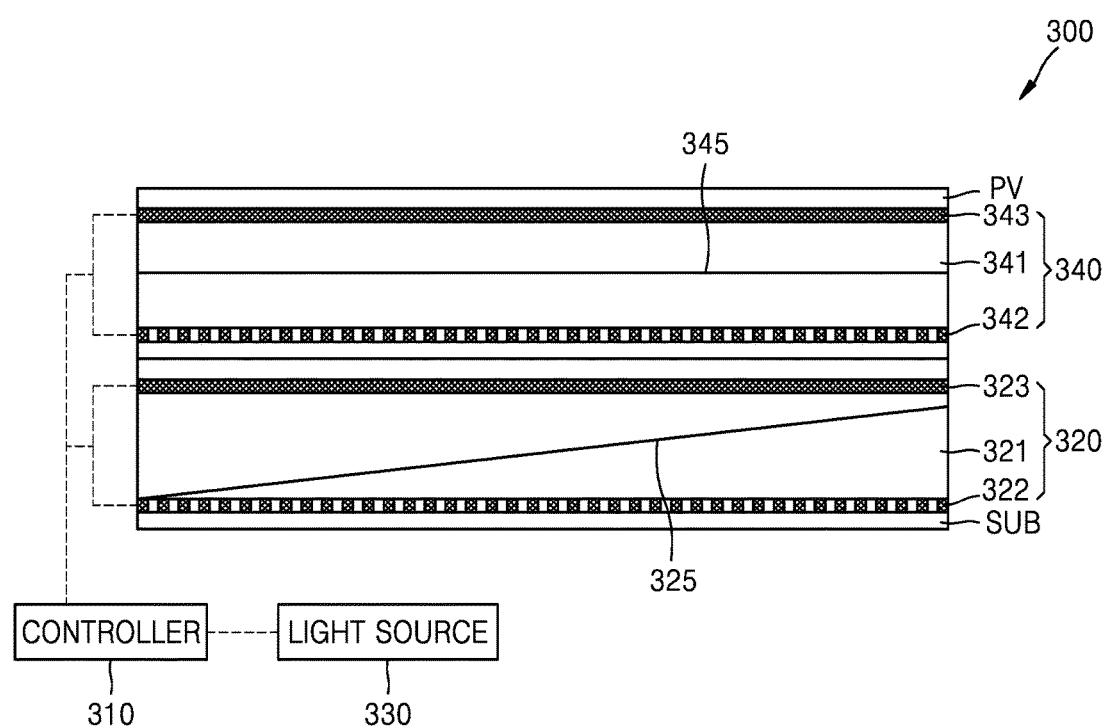
FIG. 10 is a schematic cross-sectional view of a light deflector according to an embodiment.

FIG. 10 is a schematic cross-sectional view of a light deflector 300 according to another exemplary embodiment. Referring to FIG. 10, a second light deflecting unit 340 is located on a light path in which light that has passed through a first light deflecting unit 320 proceeds, and may have a light path conversion surface 345 that varies so as to adjust the deflection direction of the light that has passed through the first light deflecting unit 320. That is, the second light deflecting unit 340 may be located on the first light deflecting unit 320.

The second light deflecting unit 340 includes the light path conversion surface 345 that varies so that the deflection direction of the incident light is adjusted, wherein the light path conversion surface 345 may be inclined in a direction that is different from an inclination of the light path conversion surface 325 of the first deflecting unit 320. The light deflector 300 of the exemplary embodiment may separately adjust the light path conversion surfaces 325 and 345 that are inclined in different directions, and thereby two-dimensionally adjust the deflection direction of the light. For example, a variable axis of the light path conversion surface 325 of the first light deflecting unit and a variable axis of the light path conversion surface 345 of the second light deflecting unit may be perpendicular to each other. In this case, when the first light deflecting unit 320 adjusts the variation in the light path by using an X-axis as the variable axis, the second light deflecting unit 340 may adjust the variation in the light path by using a Y-axis as the variable axis. The light deflector 300 may be used in a 3D device such as a time of flight (TOF) camera.

Figure 11:
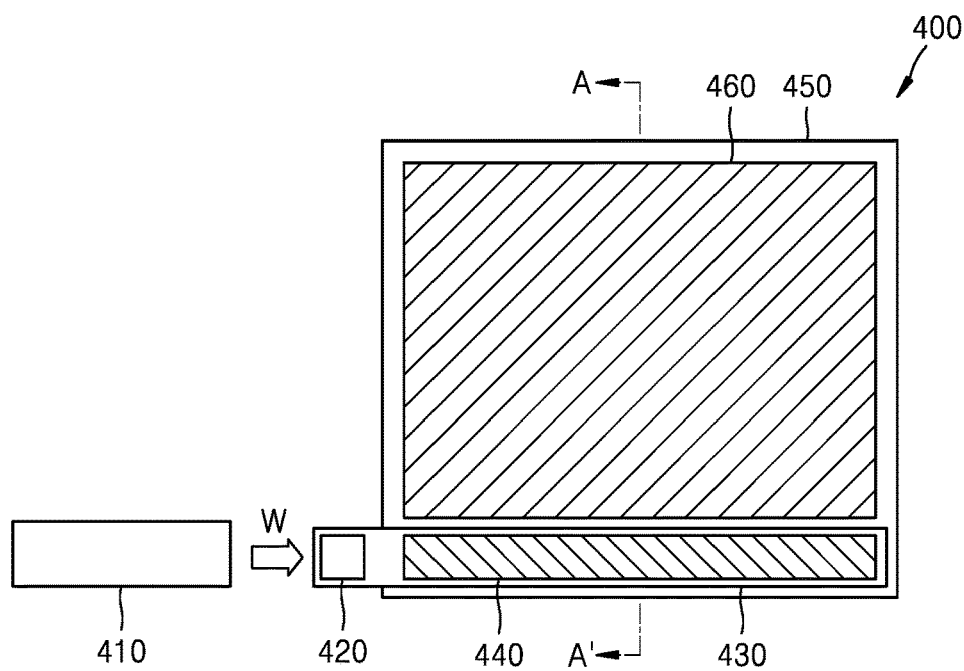
FIGS. 11 and 12 are schematic diagrams of a display apparatus including a light deflector according to an embodiment.
Figure 12:
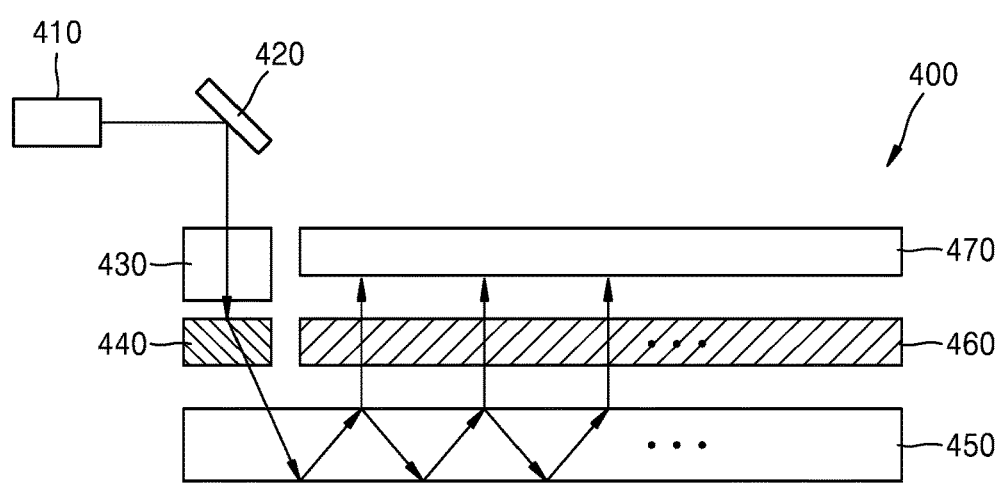

FIGS. 11 and 12 are schematic diagrams of a display apparatus 400 including a light deflector according to an exemplary embodiment. Referring to FIG. 11, the display apparatus 400 may include the light deflector described above as a light source 410. White light W emitted from the light source 410 may be incident to a beam expander 430 via a light path conversion member 420. The white light W incident into the beam expander 430 may be totally reflected along the beam expander 430. Due to a first grating pattern 440 formed on the beam expander 430, the white light W may be incident into a waveguide 450 from the beam expander 430. The white light W may be totally reflected along the waveguide 450 two-dimensionally. Due to a second grating pattern 460 formed on the waveguide 450, the white light W may be incident to a display 470 from the waveguide 450. The display 470 may display various images from the white light W. The display 470 may be a flat display panel, examples of which may include a liquid crystal display panel, a field emission display panel, a plasma display panel, and an electrophoresis display panel.

Referring to FIG. 12, the first grating pattern 440 and the second grating pattern 460 are separately illustrated from the waveguide 450 for convenience of description, but the present exemplary embodiment is not limited thereto. For example, the first grating pattern 440 and the second grating pattern 460 may be provided in contact with the waveguide 450. For example, the first grating pattern 440 and the second grating pattern 460 may be formed in some region of the waveguide 450.

The light deflector according to the exemplary embodiment may be used as a deflecting device on the display 470. For example, the light deflector may be disposed on the display 470 so as to deflect images emitted from the display 470 variously according to a displaying type. For example, the light deflector may operate to implement a light deflection function such as a lenticular lens by using an index gradient of the light deflector, and thus, a glassless 3D image may be realized.

Also, the light deflector may be used in a 3D display apparatus. By using at least one light deflector, light beams may be projected to both eyes of an observer at the same angle from opposite directions, within the same time section. According to a related-art 3D display, for example, when the 3D display is driven at 60 Hz, an operating speed of 120 Hz may be necessary because light is emitted alternatively to left and right eyes of the observer. However, the light reflector according to the exemplary embodiment may form multiple light path conversion surfaces which lead light to observer's left and right eyes from opposite angles within the same time section, so that the 3D image may be implemented with an operating speed of 60 Hz.

The light deflector and the display apparatus according to one or more exemplary embodiments may include the light path conversion surface that is variable so that a plurality of incident beams having different wavelengths may be emitted at the same angle. Therefore, the light deflector and the display apparatus may prevent the scattering when the light is deflected, and thus, high deflection efficiency may be obtained. In addition, the light deflector may operate in the time multiplexing manner or the space multiplexing manner.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A light deflector comprising:
a light source configured to emit a first light of a first wavelength, at a first time, and emit a second light of a second wavelength different from the first wavelength, at a second time;
a first light deflecting member comprising a first light path conversion surface configured to deflect the first light and the second light incident onto the first light path conversion surface; and
a controller configured to:
in response to the first light being emitted at the first time, adjust an inclination of the first light path conversion surface so that the first light path conversion surface deflects the first light incident onto the first light path conversion surface, in a same direction; and
in response to the second light being emitted at the second time after the first time, readjust the inclination of the first light path conversion surface so that the first light path conversion surface deflects the second light incident onto the first light path conversion surface, in the same direction.

2. The light deflector of claim 1, wherein the first light deflecting member comprises:
a light deflecting layer in which the first light path conversion surface is disposed;
a first electrode layer disposed on a first surface of the light deflecting layer; and
a second electrode layer disposed on a second surface of the light deflecting layer,
wherein the light deflecting layer is disposed between the first electrode layer and the second electrode layer.

3. The light deflector of claim 2, wherein the first electrode layer comprises a plurality of first sub-electrodes that are spaced apart from one another.

4. The light deflector of claim 3, wherein the second electrode layer is a common electrode configured to apply a voltage between the second electrode layer and each of the plurality of first sub-electrodes.

5. The light deflector of claim 3, wherein the controller is further configured to apply a voltage to each of the plurality of first sub-electrodes to adjust the first light path conversion surface.

6. The light deflector of claim 3, wherein a refractive index distribution of the light deflecting layer is obtained according to a voltage distribution that is applied between each of the plurality of first sub-electrodes and the second electrode layer, and
the first light path conversion surface comprises an interface between two different refractive indexes in the light deflecting layer.

7. The light deflector of claim 2, wherein the first electrode layer and the second electrode layer comprise a transparent conductive material.

8. The light deflector of claim 2, wherein the light deflecting layer comprises liquid crystal.

9. The light deflector of claim 1, wherein the controller is further configured to control the light source and the first light deflecting member so that the first light and the second light passes through the first light deflecting member in a time multiplexing manner.

10. The light deflector of claim 9, wherein the controller is further configured to:
divide one frame into a plurality of sub-frames;
control the light source so that the first light and the second light are incident onto the first light deflecting member, at a same angle, within the plurality of sub-frames; and
control the first light deflecting member so that angles of the first light and the second light incident onto the first light path conversion surface are different from one another.

11. The light deflector of claim 10, wherein time durations of the plurality of sub-frames are equal to each other.

12. A light deflector comprising:
a light source configured to emit a first light of a first wavelength and a second light of a second wavelength different from the first wavelength;
a first light deflecting member comprising a first light path conversion surface configured to deflect the first light and the second light incident onto the first light path conversion surface;
a controller configured to control the first light path conversion surface to deflect the first light and the second light incident onto the first light path conversion surface, in a same direction; and
a second light deflecting member comprising a second light path conversion surface having a variable inclination so that a deflection direction of incident light incident onto the second light path conversion surface is adjusted.

13. The light deflector of claim 12, wherein the light source is further configured to emit the first light to the first light deflecting member, and emit the second light to the second light deflecting member.

14. The light deflector of claim 13, wherein the controller is further configured to:
control the first light deflecting member so that the first light is incident onto the first light path conversion surface at a first incident angle; and
control the second light deflecting member so that the second light is incident onto the second light path conversion surface at a second incident angle different from the first incident angle.

15. The light deflector of claim 14, further comprising one or more light path conversion members configured to convert, to a same light path, the first light and the second light that are respectively emitted from the first light deflecting member and the second light deflecting member.

16. The light deflector of claim 15, wherein each of the one or more light path conversion members comprises a dichroic mirror.

17. The light deflector of claim 12, wherein the second light deflecting member is located on a light path through which the first light and the second light deflected from the first light deflecting member proceeds, and
the second light path conversion surface has the variable inclination so that the same direction of the first light and the second light incident onto the second light path conversion surface is adjusted.

18. The light deflector of claim 17, wherein a first inclination of the first light path conversion surface varies along a first axis; and
the variable inclination of the second light path conversion surface varies along a second axis perpendicular to the first axis.

19. A display apparatus comprising:
a light source configured to emit a first light of a first wavelength, at a first time, and emit a second light of a second wavelength different from the first wavelength, at a second time;
a first light deflecting member comprising a first light path conversion surface configured to deflect the first light and the second light incident onto the first light path conversion surface;
a controller configured to:
in response to the first light being emitted at the first time, adjust an inclination of the first light path conversion surface so that the first light path conversion surface deflects the first light incident onto the first light path conversion surface, in a same direction; and
in response to the second light being emitted at the second time after the first time, readjust the inclination of the first light path conversion surface so that the first light path conversion surface deflects the second light incident onto the first light path conversion surface, in the same direction; and
a display panel configured to modulate the first light and the second light that are deflected, based on image information.

* * * * *